Feb. 14, 1950     O. KORNEI     2,497,675
INDICATING DEVICE WITH AUTOMATIC ZERO ADJUSTMENT
Filed Oct. 30, 1946     2 Sheets-Sheet 1

*INVENTOR.*
OTTO KORNEI
BY
ATTORNEY

Feb. 14, 1950     O. KORNEI     2,497,675
INDICATING DEVICE WITH AUTOMATIC ZERO ADJUSTMENT
Filed Oct. 30, 1946     2 Sheets-Sheet 2

INVENTOR.
OTTO KORNEI
BY
ATTORNEY

Patented Feb. 14, 1950

2,497,675

UNITED STATES PATENT OFFICE 2,497,675

INDICATING DEVICE WITH AUTOMATIC ZERO ADJUSTMENT

Otto Kornei, Cleveland Heights, Ohio, assignor to The Brush Development Company, Cleveland, Ohio, a corporation of Ohio Application October 30, 1946, Serial No. 706,584

8 Claims. (Cl. 177—351)

My invention pertains to mechanisms for automatically adjusting the phase relationship between a series of repetitive and equally spaced signals with respect to a predetermined reference position.

An object of my invention is to provide means for automatically adjusting the phase relationship between a series of repetitive and equally spaced signals with respect to a predetermined reference position.

Often it is desirable to adjust the phase relationship between a series of repetitive and equally spaced signals with respect to a predetermined reference position. An example of an instrument wherein such an adjustment is desirable is found, for instance, in my Patent Number 2,370,176, wherein a first magnetic pulse representative of the beginning of a time interval to be measured and a second magnetic pulse representative of the end of the time interval are recorded on a magnetizable disk rotating at a known rate. The angular displacement between the positions at which the first and second pulses were recorded is a direct function of the duration of the interval. In order to determine the angular displacement between the two records, the disk is repeatedly rotated past two magnetic reproducing heads each of which establishes a series of electrical signals. One series of signals ignites a first glow tube momentarily once during each rotation of the disk past one reproducing head, and the other series of signals ignites a second glow tube momentarily once during each rotation of the magnetizable disk past the other reproducing head. A scale disk calibrated in terms of time intervals is rotated in synchronism with the rotation of the magnetizable disk and by the stroboscopic effect produced through repeatedly momentarily illuminating the scale by the two glow tubes the scale will appear to be stationary twice during each revolution, and the angular difference in the two scale positions is a measure of the time interval and can be determined by comparing the relative position of the two scale images which, due to the stroboscopic effect, seem to be stationary.

It is desirable that the scale disk be positioned in a housing which shields it from illumination other than that provided by the two glow tubes, and an eye piece in the housing is provided through which the operator can view a limited portion of the rotating scale. Upon looking through the eye piece at the two scale images, a direct indication of the time interval can be obtained by subtracting the reading on the scale image corresponding to the beginning of the time interval from the reading on the other scale image corresponding to the end of the time interval, but it is far easier and much less subject to error on the part of the operator if the "zero section" of the scale image corresponding to the beginning of the time interval can be brought into the field of the eye piece. In this position the operator does not have to subtract one scale reading from the other, but merely reads the indication of the scale image with respect to the "zero section" which is within the field of the eye piece and thus directly obtains a reading which is a measure of the time interval.

The present invention relates to means for automatically causing the "zero section" of the scale image corresponding to the beginning of the time interval to move until it appears in the field of the eye piece and then to stop. From this explanation it becomes clear that the main object of the invention is to provide means for shifting the image of the "zero section" until it appears within the fixed field of vision of the eye piece. The invention is not to be construed as limited to use with such a device as it is applicable to many systems wherein a series of pulses or signals is to be brought into a given phase relationship with a predetermined reference position.

With reference to the drawings Figure 1 is a diagram, partially in block form and with some of the mechanism in cross-sectional side view, showing one form of my invention.

Figure 1A is a detail plan view of one of the parts shown in Figure 1.

Figure 2 schematically indicates two series of pulses whose phase relationship is to be adjusted.

Figure 1:
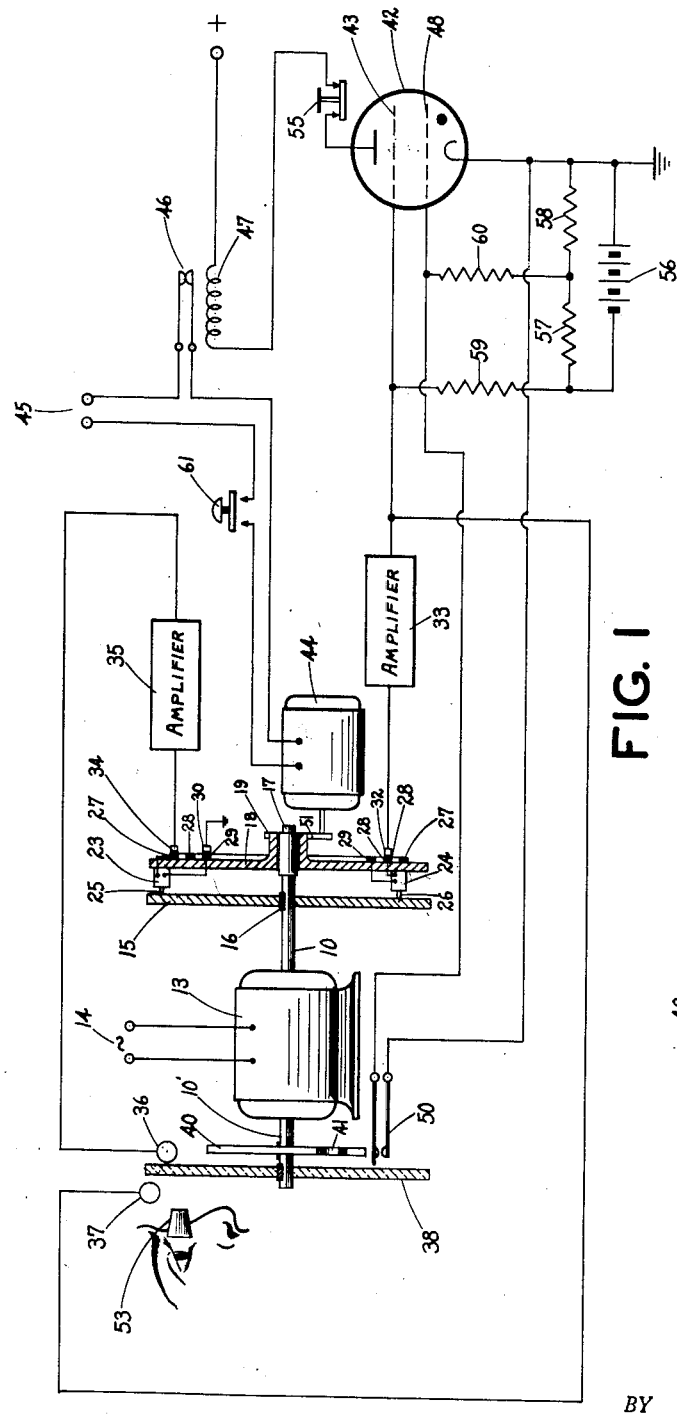

One example of a mechanism for practicing my invention is shown in Figure 1 and comprises a shaft 10 which is rotated by the motor 13 energized from a current source 14. A disk 15 of magnetizable material is fastened to the shaft 10 by means of key 16 and rotates as the shaft 10 is driven by motor 13. A bearing surface 17 is provided on the shaft 10 and a disk 18 which includes a gear portion 19 is mounted on the bearing 17 so that it can remain stationary as the shaft 10 rotates and so that through the gear 19 it can be rotated slowly with respect to the shaft 10 and the magnetizable disk 15 and independently of the rotation of disk 15 by the motor 13. The disk 18 serves as a mounting structure for two magnetic recording-reproducing heads 23, 24 which include, respectively, pole pieces 25, 26 held in magnetic flux linkage relationship with the magnetizable disk 15, and the back face of the disk 18 carries three slip rings 27, 28, 29. The slip ring 29 through a stationary brush 30 provides a ground contact for both of the transducer heads 23, 24; the slip ring 28 through stationary brush 32 connects the transducer head 24 to the amplifier 33; and the slip ring 27 through stationary brush 34 connects the transducer head 23 to the amplifier 35.

The magnetic disk 15 has had recorded on it two magnetic impulses, one corresponding to the beginning of the time interval to be measured and the other corresponding to the end of the interval to be measured. One of the impulses is on the annular path scanned by the pole piece 25 of the recording-reproducing head 23 and the other is on a second concentric annular path scanned by the pole piece 26 of the recording-reproducing head 24 as the disk 15 rotates, and these impulses are offset angularly with respect to each other by an amount related to the rate of rotation of the disk 15 during the time interval to be measured. For a detailed description of the recording mechanism, reference may be had to my Patent Number 2,370,176.

The two impulses may have been recorded on the disk 15 during one rotation thereof, or the disk may have rotated many times between the instants at which the first and second impulses were recorded as has been explained in connection with Figure 6 of Patent 2,370,176. However, in either case, upon reproduction of the recorded impulses, each is reproduced once during each rotation of the disk 15, and the disk 15 is continuously and rapidly rotated whereby a first series of electrical impulses is produced at the output of reproducing head 23 and a second series is produced at the output of reproducing head 24.

The electrical impulses from reproducing head 23 are fed through slip ring 27 and stationary contact brush 34 to the input of amplifier 35, and the output from the amplifier is fed to the glow tube 36 so that the tube flashes very briefly once during each revolution of the disk 15. The electrical impulses from reproducing head 24 are fed through slip ring 28 and stationary contact brush 32 to the input of amplifier 33, and the output from the amplifier is fed to the glow tube 37 so that the tube flashes very briefly once during each revolution of the disk 15. The rate to repetition of these flashes should be high enough to create a substantially flicker-free impression in the observer's eye; i. e., in the order of sixteen times per second or higher.

A disk 38 with a specially prepared scale is rotated in synchronism with the rotation of disk 15, preferably by mounting it on an extension 10' of the motor shaft 10. The disk 38 is located with its peripheral or scale portion between the two glow tubes 36, 37. An eye piece 53 is mounted by suitable means, not shown, so that the operator upon looking through it will see a portion of the scale in the region which is illuminated by the glow tubes.

The scale on the disk is prepared in such a manner that its "zero section," which is reflective but opaque, becomes visible only upon illumination from glow tube 37 while the rest of the scale, which is non-reflective but light-transmitting, becomes visible only upon illumination from the glow tube 36. For further details, reference is made to Figures 8, 9 and 10 of Patent 2,370,176.

From this mode of operation, it becomes clear that a reading is obtained from the superposition of the seemingly stationary image of the "zero section" upon the seemingly stationary image of the rest of the scale when the scale is stroboscopically illuminated by the two tubes 36 and 37 as explained before. It is also evident that a significant reading can be obtained only when the "zero section" of the rotating scale disk is located within the field of vision of the eyepiece at the instants the "zero section" is illuminated by the flashes of tube 37.

The starting pulse energizing tube 37 may have been recorded at any point of the circumference of disk 15, so that the flashes originating from tube 37 will, in general, illuminate the scale disk in a position in which the "zero section" is not within the field of vision of the eyepiece. It will, consequently, become necessary to artificially shift the flashing of tube 37 in such a manner that the "zero section" of scale disk 38 is illuminated at the instant it passes through the field of vision of the eyepiece. In order to achieve this result, disk 18 bearing the two heads 23 and 24 is rotated about the motor shaft 10 until the starting flash occurs at the desired instant. It should be noted that by doing so, the relative positions of the two heads and the relative positions of the starting and ending pulses on the disk 18 are not changed, and so the duration of the interval to be measured is not altered. To express this more clearly, the only effect obtained by the described procedure is the shifting of the phase relationship between the two series of pulses reproduced from disk 15 simultaneously with respect to the predetermined position of the eyepiece. The rotation of disk 18, whose position determines the flashing instant of tubes 37 and 36, may be attained either manually or automatically.

The motor shaft 10 carrying the magnetizable disk 15 and the scale disk 38 also carries a cam disk 40 with a cam 41 in fixed angular relationship to the "zero section" on the scale disk 38. Assume that the starting and ending pulses, generated from the rotating disk 15 by the heads 24 and 23 respectively, are causing the tubes 37 and 36 to flash at an interval determined by the time interval to be measured, but in an arbitrary phase relationship with respect to the "zero section" on scale disk 38. It will be noted that the amplified starting pulse from the output of amplifier 33 is not only fed into tube 37 but also into the control grid 43 of thyratron 42, which is normally non-conducting. This means that when the push button 61 is closed, the auxiliary motor 44, which obtains its power from source 45 through the relay contacts 46, will be operating until contacts 46 are opened by the relay winding 47 becoming energized through thyratron 42. The function of push button 61 will later be explained in detail.

Grid 48 of thyratron 42 is normally biased negatively to such an extent that the positive pulses from amplifier 33 fed to grid 43 cannot "fire" tube 42. It can be seen, however, that contacts 50, when closed, will bring grid 48 to cathode potential which means that the negative bias from grid 48 is removed. Under this condition the signal pulses reaching grid 43 will be sufficient to "fire" the thyratron 42, thereby energizing the relay winding 47 and thus opening contacts 46 to stop the motor 49.

The mode of operation of the circuit is as follows: after the recording of two signal pulses, defining the beginning and the end of the time interval to be measured, the amplifiers 33 and 35 will immediately start supplying glow tubes 37 and 36 with the reproduced control pulses, thereby causing these tubes to flash accordingly. Motor 44 will, in general, be operating when push button 61 is closed, thereby slowly rotating disk 18 through a gear train 51.

Cam 41 of disk 40 will close the contacts 50 momentarily once during each revolution of motor 13, thereby removing the negative blocking bias from grid 48 of the thyratron 42. The proper negative bias voltages to the grids 43 and 48 of the thyratron are supplied through resistors 59 and 60 from battery 56 by means of the voltage divider consisting of resistors 57 and 58. So long as there is no positive signal reaching grid 43 during the interval for which the bias is removed from grid 48, the thyratron will stay non-conducting and motor 44 will keep on rotating disk 18, thereby slowly and simultaneously shifting the instants at which the two glow tubes flash. Eventually disk 18 will reach a position where the flashing of tube 37 coincides with the moment at which the "zero section" appears in front of the eye piece. The disk 18 will then stop, provided the cam disk was originally arranged in a correct relation with respect to the "zero section." This relation is attained in the initial assembly of the instrument by mounting the cam disk in the motor shaft in such manner that the cam closes contacts 50 when the "zero section" is in front of the eye piece.

When this is the case, the starting pulses amplified in amplifier 33, will reach grid 43 of the thyratron 42 at an instant when the blocking voltage is removed from the grid 48 due to the fact that contacts 50 are momentarily closed by cam 41. The thyratron will consequently become conducting, current will start to flow through relay winding 47, relay contacts 46 will open, and motor 44 will stop in such position that the glow tube 37 will illuminate the "zero section" of the scale disk in the desired position in front of the eye piece.

Figure 2:
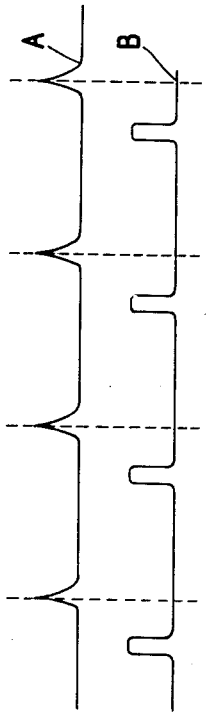
Figure 1A:
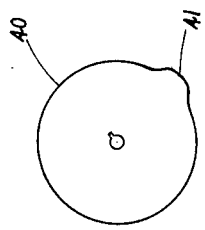

A better understanding of the details may be obtained by referring to Figure 2. In this figure line A represents the sequence of the starting pulses repetitively reproduced from disk 15, which pulses are fed to grid 43 of thyratron 42. Another sequence of pulses, caused by the periodic closing of contact 50 by the cam disk 40, will reach grid 48 of thyratron 42. These pulses are schematically shown in line B of Figure 2 in which the base line indicates the negative blocking potential of the grid 48 and the peaks represent the more positive grid potential for the short time intervals during which the bias is removed.

When disk 18 is slowly rotated by motor 44 the sequence of pulses which are represented in line A of Fig. 2 will start to move either to the right or to the left, depending upon the direction of rotation of motor 44. Eventually the sequence of the pulses of line A will assume a position where it coincides with the pulses of line B. When this is the case, the thyratron becomes conducting and will start a chain of events, as described before, which will stop the rotation of disk 18 in the desired position.

Subsequent starting pulses reaching grid 43 of the thyratron will have no further effect and the thyratron will stay conducting as long as desired. In order to prepare the circuit for a new measurement, the current flow through thyratron 42 has to be interrupted, for instance, by means of push button 55. After such current interruption, relay contacts 46 will close and motor 44 will start rotating again until the next coincidence between starting pulses reaching grid 43 and removal of blocking bias of grid 48 occur simultaneously.

To avoid incorrect time measurements, it is obvious that motor 44 must not be running during the recording of the time interval. The normally open push button 61 is therefore provided which will keep motor 44 from rotating until the time interval has been recorded, after which the push button is closed to automatically cause the "zero section" to appear in the field of the eyepiece. It is obvious that the manual closing of push button 61 may be replaced by an automatic action, for instance, by a relay which closes upon occurrence of the ending pulse of the time interval.

Summarizing, the following steps have to be taken when a time measurement is to be made:

First: Record the starting and ending pulses on disk 15, as explained in Patent No. 2,370,176.

Second: Close push button 61 until the "zero section" of scale disk 38 appears in the field of eyepiece 53. Push button 61 may then be released and the reading may be observed as long as desired.

Third: Before making a new measurement, depress push button 55 momentarily to render thyratron 42 non-conductive and receptive to the starting pulses of the next time interval to be measured.

In order to simplify the operation of the unit, push button 55 may be combined with the so-called "reset" push button as described in Patent No. 2,370,176. It may be repeated here that the primary purpose of this "reset" button is to erase any previous recording on disk 15.

Figure 3:
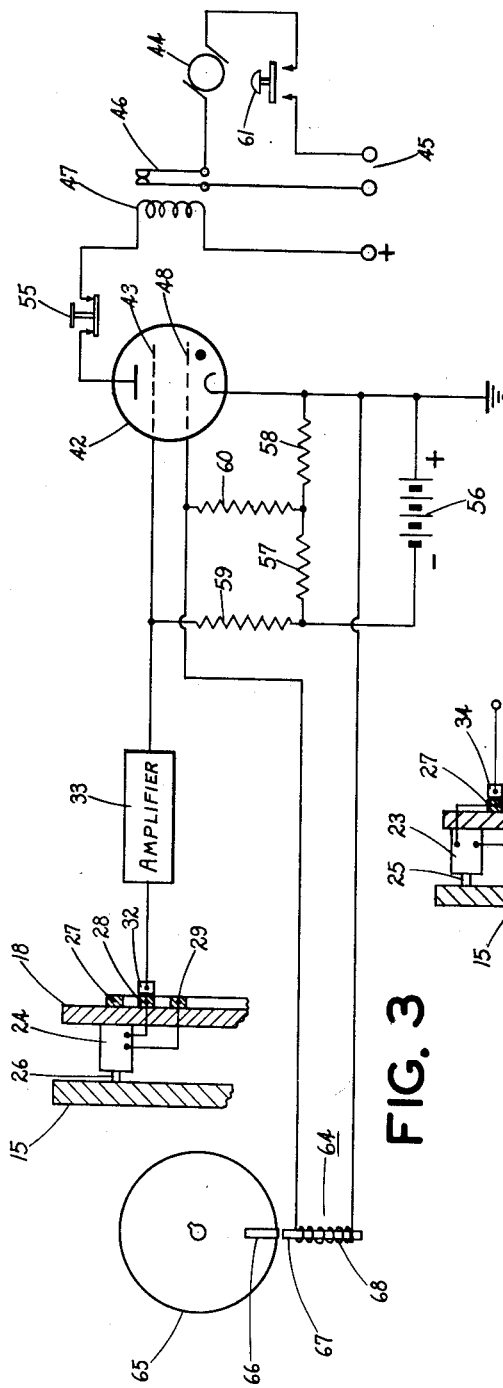
Figure 3 is a circuit diagram of another form of my invention.

Figure 3 indicates an alternative method to generate the deblocking pulses fed into grid 48 of tube 42. In this arrangement the grids 43 and 48 of tube 42 are normally supplied with the proper negative bias voltages in a manner identical to the previously described method.

In order to momentarily remove the negative bias from grid 48, a positive electrical pulse is applied to this grid once during each revolution of the disk 15. A disk 65 is rotated in synchronism with the rotation of the disk 15, preferably by mounting it on motor shaft 10 with disk 15 in very much the same way as the previously described cam disk 40.

Disk 65, made of any non-magnetic material, carries a small permanent magnet 66 on its periphery. A pickup head 64 consisting of a soft iron core 67 and a coil or winding 68 is arranged in close proximity to the periphery of said disk 65. When magnet 66 moves past this pickup head, it will generate in the coil an electrical pulse essentially consisting of a positive and a negative half which is fed into grid 48 of tube 42. The device is so adjusted that the positive half of this pulse substantially cancels the negative bias normally applied to grid 48, thus bringing this grid momentarily and approximately to cathode potential. The negative half of the pulses will merely add to the normally existing negative potential and is consequently of no further significance.

Figure 4:
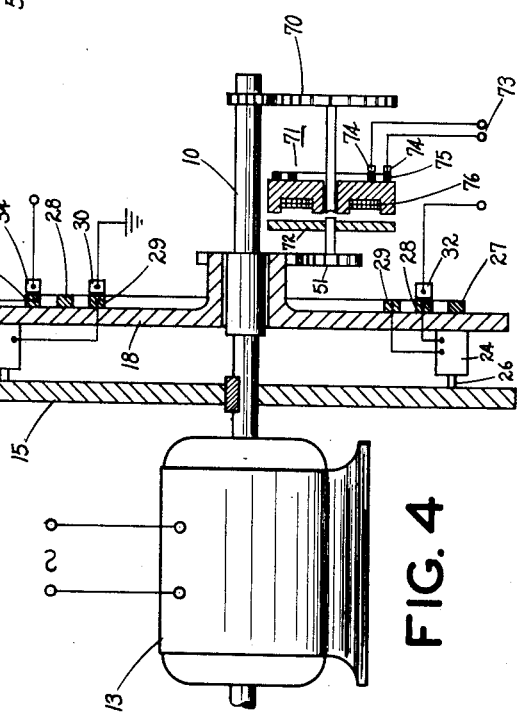
Figure 4 is a sectional view of a modified form of a driving mechanism.

An alternative method to using a separate motor 44 for the rotation of disk 18, as shown in Figure 1, is pictured in Figure 4. The power required to rotate disk 18 is derived from the main motor 13 by means of motor shaft 10, a gear train 70, magnetic clutch 71 and 72, and gear train 51. When the main motor 13 is rotating, gear train 70 will continuously drive the section 71 of the magnetic clutch at a reduced speed. So long as this clutch is not energized, it will not transmit any torque through disk 72 to gear train 51 and the disk 18 will, consequently, remain stationary. When the magnetic clutch is energized, however, by supplying current from a source 73 through the brushes 74, slip rings 75 to its winding 76, disk 72 will be magnetically coupled to the clutch section 71 and disk 18 will start to rotate. The current supply to the magnetic clutch may be controlled in the same way as the current supply to the auxiliary motor 44 was controlled in the previously described Figure 1.

The described arrangement obviates the use of a separate motor 44 and makes the whole equipment more compact and less expensive to manufacture.

Although I have described my invention with a certain degree of particularity, it is obvious that many other means for achieving the same or substantially the same desired results may be utilized without departing from the spirit and scope of my invention.

I claim as my invention:

1. In an indicating device with an eye piece, indicia means a portion of which is observable through said eye piece, a record medium, driving means for uniformly rotating said indicia means and said record medium in synchronism, means for uniformly repeatedly reproducing a momentary signal from said record medium, electrically controlled drive means having a power supply circuit including normally closed switch means for rotating said reproducing means with respect to said record medium in addition to the relative uniform motion therebetween, a first control switch and a second control switch connected to said switch means in the power supply circuit for said drive means, circuit means connecting said first control switch to said second control switch, a control cam, means for driving said control cam in synchronism with said indicia means and said record medium for momentarily and periodically closing the first of said control switches, means connecting said second control switch to the signal reproducing means from which it receives periodic and momentary electrical impulses, said second control switch becoming conducting upon the first coincidence of one of said electrical signal impulses from said reproducing means with the closing of said first switch to cause the said normally closed switch in said power supply circuit for the drive means to open and remain open.

2. In an indicating device with an eye piece, indicia means a portion of which is observable through said eye piece, a record medium, driving means for uniformly rotating said indicia means and said record medium in synchronism, means for uniformly repeatedly reproducing a momentary signal from said record medium, electrically controlled drive means having a power supply circuit including normally closed switch means for rotating said reproducing means with respect to said record medium in addition to the relative uniform motion therebetween, impulse generating means for generating periodic and momentary electrical impulses in synchronism with the rotation of said indicia means and said record member, a control switch connected to said impulse generating means, means connecting said control switch to said signal reproducing means from which it periodically receives momentary electrical impulses, said control switch becoming conducting upon the first coincidence of one of said electrical signal impulses from said reproducing means with one of the said electrical impulses from said generating means to cause the normally closed switch in said power supply circuit for the drive means to open and remain open.

3. An indicating device as set forth in claim 1 further characterized by said electrically controlled drive means comprising an electric motor.

4. An indicating device as set forth in claim 2 further characterized by said electrically controlled drive means comprising an electric motor.

5. An indicating device as set forth in claim 1 further characterized by said second control switch comprising a grid controlled thyratron tube.

6. An indicating device as set forth in claim 2 further characterized by said control switch comprising a grid controlled thyratron tube.

7. An indicating device as set forth in claim 5 further characterized by said tube having two grids, one connected to said reproducing means and the other connected to said first control switch.

8. An indicating device as set forth in claim 6 further characterized by said tube having two grids, one connected to said reproducing means and the other connected to said impulse generating means.

OTTO KORNEI.

REFERENCES CITED

The following references are of record in the file of this patent:

UNITED STATES PATENTS

| Number | Name | Date |
| --- | --- | --- |
| 2,326,880 | Norrman | Aug. 17, 1943 |
| 2,370,176 | Kornei | Feb. 27, 1945 |
| 2,395,127 | Kornei | Feb. 19, 1946 |

FOREIGN PATENTS

| Number | Country | Date |
| --- | --- | --- |
| 481,287 | Great Britain | Mar. 8, 1938 |